United States Patent [19]

Malone

[11] 3,865,774
[45] Feb. 11, 1975

[54] PORCELAIN-LIKE COMPOSITION

[76] Inventor: Laurence A. Malone, 2111 Jefferson Davis Hwy., Apt. 220S, Arlington, Va. 22202

[22] Filed: Apr. 9, 1974

[21] Appl. No.: 459,387

[52] U.S. Cl. ...... 260/29.6 S, 156/94, 260/29.6 WB, 260/29.6 PS, 260/42.13, 264/36
[51] Int. Cl. ............................................ C08f 45/04
[58] Field of Search ............ 260/29.6 S, 29.6 WB, 260/29.6 PS, 42.13

[56] References Cited
UNITED STATES PATENTS 2,631,940  3/1953  Dunegan........................ 260/29.6 S
3,126,355  3/1964  Birten et al..................... 260/29.6 S Primary Examiner—James H. Derrington
Attorney, Agent, or Firm—Larson, Taylor & Hinds

[57] ABSTRACT

A composition comprising a first component and from 30 to 70 percent by volume of a second component hardens spontaneously into a hard, porcelain-like substance when the two components are mixed. No firing is required and the composition has a suitable pot life to permit shaping. The first component includes calcium oxide, potassium silicate, sodium oxide, alumina, and zinc oxide. The second component includes polyvinyl acetate, polyvinyl alcohol, and alkanolamine, a plasticizer for polyvinyl acetate, and water.

9 Claims, No Drawings

3,865,774

PORCELAIN-LIKE COMPOSITION

BACKGROUND OF THE INVENTION

This invention relates to hardenable material compositions comprising calcium oxide, alumina, and a silicate, and to uses of the compositions as porcelain substances, including mending cements and other applications in the porcelain arts.

Porcelain (china) is made of a dull substance commercially and industrially called mud. The main ingredient is silicon dioxide in the form of glassy, nonmetallic sand, and the other essential constituent is alumina. When the silica and alumina are combined with kaolin, which is a very fine white clay, ball clay is formed. This must be fired at high temperatures to produce fine types of porcelain china.

A great need exists for a material externally identical or interchangeable with porcelain and similar ceramics which may be shaped and which is readily hardenable without firing. Such a material can be used for porcelain repair, as a cement to bind pieces previously broken, as an outer layer area to replace chipped glaze, and as a molding material to fashion major parts such as handles to be attached to an existing item.

A material which hardens without being subjected to high temperatures not only may be used with considerable convenience and efficiency, but may be used to repair or modify china decorated by paint or otherwise by materials which would be destroyed at high temperatures.

The material desirably should also exhibit a small coefficient of expansion, matching that of porcelain. If not, unbalanced forces and consequent failures may occur as a result of ordinary changes in ambient temperatures. The material should also desirably withstand high temperatures to which a china-like object may be subjected in use.

It is an object of the present invention to provide a material which is capable, without firing, of hardening into a hard and porcelain-like substance.

It is an object of this invention to provide a process and a conveniently hardenable porcelain substitute, which is sufficiently strong and exhibits the lustrous finish of porcelain.

It is another object of this invention to provide a process and a cement or mortar which sets to a hard, white material which may be substantially externally indistinguishable from porcelain.

It is similarly an object of this invention to provide a process and a cement or mortar which hardens to a rigid bond substantially impervious to water and to changes of temperature.

It is another object of this invention to provide a process and a cement or mortar which is conveniently moldable and which hardens without heating or baking, fairly rapidly.

It is similarly an object of this invention to provide a process and a cement or mortar which readily hardens at normal room temperatures.

It is another object of this invention to provide a process and a cement or mortar having a low coefficient of expansion similar to that of porcelain.

It is another object of this invention to provide materials for the repair, modification and rebuilding of porcelain and the like without heating of any kind and without high temperature treatment.

It is similarly an object of this invention to provide processes for the repair, modification and rebuilding of decorated and painted porcelain and the like.

SUMMARY OF THE INVENTION

The foregoing and other objects which will be apparent to those having ordinary skill in the art are achieved according to the invention by providing a composition including a first component in admixture with from 30 to 70 percent by volume of a second component. The first component includes from 5.5 to 8 percent by weight of calcium oxide, from 45–75 percent by weight of potassium silicate, from 5.5 to 11 percent by weight of sodium oxide, from 12 to 21 percent by weight of alumina, and from 1 to 40 percent by weight of zinc oxide, the percentages by weight being based on the total amount of said first component, and the second component includes from 30 to 50 percent by weight of polyvinyl acetate resin, from 8 to 15 percent by weight of polyvinyl alcohol resin, from 30 to 50 percent by weight of water, from 2 to 10 percent by weight of an alkanolamine having an alkyl group of up to five carbon atoms, and from 2 to 10 percent by weight of a plasticizer for polyvinyl acetate resin, the solid ingredients of the composition being in the form of particles at least 50 percent by weight of which are less than 10 mesh, U.S. sieve size.

DETAILED DESCRIPTION

The following example illustrates the invention.

EXAMPLE I (Composition)

EXAMPLE I — (Composition)

First Component

| Material | Amount (grams) |
| --- | --- |
| Calcium oxide CaO (minus 100 mesh, U.S. sieve) | 6.3 |
| Potassium Silicate $K_2SiO_3$ (minus 100 mesh) | 61.8 |
| Sodium oxide $Na_2O$ (minus 100 mesh) | 6.8 |
| Alumina $Al_2O_3$ (minus 100 mesh) | 16.8 |
| Zinc oxide ZnO (minus 100 mesh) | 8.3 |

Second Component

| Material | Amount (grams) |
| --- | --- |
| Polyvinyl acetate resin (minus 100 mesh) | 43 |
| Polyvinyl alcohol resin (minus 100 mesh) | 11.4 |
| Water | 4.8 |
| Diethyl alkanalomine | 4.8 |
| Dipropylene glycol dibenzoate | 36 |

The first component is prepared by dry blending the dry particulate ingredients in any suitable mixer. Simple hand stirring is employed in this example. The resins of the second component are conveniently in the form of resin latices in water, in which case there is normally sufficient water to meet the requirements of the second component. The alkanolamine and plasticizer may be added to blend or may be present in the resin latices.

Prior to use, a portion of the second component is blended with an equal volumetric portion of the first component and mixed in any convenient manner, in this case by hand mixing with a stiff spatula. The material is originally pasty or syrrupy, but changes to a semi-solid, putty like substance in a fairly short time of about 5 to 20 minutes, longer setting time resulting when more water is present. Free water rapidly disappears and the mixture begins to set up hard in about 45 minutes. The product sets up, without firing, to a porcelain-like material. The hardened material is strong and lustrous, is impervious to water and resistant to elevated temperature and to changes in temperature and is eminently suitable for fabricating, repairing, modification or rebuilding of porcelain-like objects.

EXAMPLES II—IV (Use)

Illustrative instructions are given in the following examples for repairing three types of common damage to china: glaze damage to the edge of a saucer or plate or similar article, lost or destroyed handles, and broken out edge chips and missing pieces. Broken out edges and missing pieces are rebuilt and, if necessary, the handle is remade. The damages discussed are by no means the only kinds of damage that can be repaired, but the discussions are indicative of basic teachings.

EXAMPLE II

Glaze Damage And Chips Replaced (Use of Powder)

1. Place small amount of the composition of Example I in a saucer.
2. Add tint or shade of pigment to match background of the china object to be mended.
3. (Optional). Add desired amount of composition to damaged edges of surfaces to be bonded.
4. (Optional). If piece to be mended is out of balance so as to create difficulty in bonding, cement the pieces together as above and use masking tape to hold them in place until setting occurs.
5. Air dry at room temperature.
6. (Optional). When cool, sipe off with acetic acid to neutralize surfaces and to prepare for ceramic decoration as desired.

EXAMPLE III (New Handle)

Making a new handle can be done in two ways. The first is by casting the composition of Example I in a rubber mold. The correct size can be taken from a like handle, or measured, or done by eye, by comparison with similar pieces or pictures or experience. The second is done by hand alone. The following is the first method:

1. Cast the handle by pressing in a rubber mold, then setting aside to dry.
2. When hard, grind and shape the ends to fit as closely as possible to the areas where the new handle will be seated.
3. Use the cutting discs to make grooves in nub areas and in the ends of the new handle.
4. Refit and cement. Dowel if necessary by drilling holes and using bailing wire.
5. Smooth away excess.
6. Tape to secure or use clamp if the handle is large.
7. Fill in all gaps by applying more of the composition as needed and allow to set 2 to 4 hours.

The same materials and equipment are required to mold a handle by hand but they are used in somewhat different ways.

1. Prepare the composition of Example I working it until it can be rolled between the hands.
2. Shape and model the new handle by hand, following the design from pictures or another cup as desired.
3. Allow to harden at room temperature to provide a completely new handle.
4. Proceed as in the preceding method to affix handle to object.

EXAMPLE IV (Rebuilding Chip)

1. Using handgrinder, cut a grid across the damaged area.
2. Clean off residue and powder with cheesecloth square.
3. Using the composition of Example I, fill the chip or flake, using art brush to press mix into all crevices.
4. Dampen fingers in water and smooth away excess.
5. If damaged area is deep, apply two or three thin layers, balancing piece in sandbox to dry between applications.
6. Sand gently until even with surrounding surfaces.
7. Match and mix final shade of paint with glaze and apply with brush, feathering out until the matching repair has become invisible.
8. Apply final coat of glaze.

Other industrial, commercial and consumer oriented applications are indicated by the desirable characteristics of the binder. Examples of such applications are as; a water-tight putty filler for cracks in masonry; a putty molding material; putty castings for molds without heat; a substitute for Gesso in picture frame making; a putty substitute for structural solder; an electrical and heat insulator; tile, floor, and wallboard mortar; a substitute for gypsum or Plaster of Paris; and, as a putty and joint compound.

The second component is utilized in an amount of from 30 to 70 percent, preferably 40 to 60 percent by volume, based on the total volume of the first and second components. While the foregoing example illustrates a particular composition, the amount of the ingredients may vary and preferred compositions are as follows:

| First Component | | |
|---|---|---|
| Material | Amount (% by weight) | |
| | Operable range | Preferred range |
| CaO | 5.5–8 | 6–7 |
| $K_2SiO_3$ | 45–75 | 45–75 |
| $Na_2O$ | 5.5–11 | 5.5–11 |
| $Al_2O_3$ | 12–21 | 12–21 |
| ZnO | 1–40 | 5–20 |
| Second Component | | |
| Material | Amount (% by weight) | |
| | Operable range | Preferred range |
| PVAc | 30–50 | 35–45 |
| PVA | 8–15 | 9–14 |
| Alkanolamine | 2–10 | 3–7 |
| Plasticizer | 2–10 | 3–7 |
| Water | 30–50 | 35–45 |

The first component may also include up to about 10 percent, preferably up to about 5 percent by weight of magnesium oxide.

Conventional pigments, texturizing agents, and the like, may also be added to either or both components in amounts needed for a desired pigmentation or texture effect, but will generally be used in an amount of not more than 30 percent by weight of the composition.

The solid ingredients are particulate and less than 10 mesh U.S. sieve size (all sieve sizes herein refer to U.S. sieves) preferably, all of the particles are minus 50 mesh, and still more preferably less than 65 mesh. At least 50 percent by weight of all of the particles are preferably less than 100 mesh and still more preferably less than 200 mesh.

The potassium silicate may be added as such or as potassium oxide ($K_2O$) and silicon dioxide ($SiO_2$). In either event, the weight ratio of these components is preferably greater than 50 percent $SiO_2$, balance $K_2O$, more preferably, at least 65 percent $SiO_2$, balance $K_2O$, and still more preferably from 70 to 80 percent $SiO_2$, balance $K_2O$. A suitable commercially available potassium silicate powder has 70 wt %=$SiO_2$, balance $K_2O$ and a particle size of minus 65 mesh, at least 50 percent minus 200 mesh.

The calcium oxide and alumina may be used in the form of readily available calcium aluminate.

The polyvinyl acetate resin and polyvinyl alcohol resin are each preferably used in the form of readily available resin latices, the resin particle size being well under 18 mesh.

The alkanolamine is preferably one having one or more alkyl groups of up to five carbon atoms and is more preferably a dialkanolamine where the alkyl groups have up to five carbon atoms such as diethanolamine. Alkyl substituted dialkanolamines, such as ethyl diethanolamine, in which the alkyl substituent has up to five carbon atoms may be used.

The plasticizer can be any conventional plasticizer for polyvinyl acetate such as the conventional benzoic acid derivatives diethylene glycol dibenzoate, dipropylene glycol dibenzoate, triethylene glycol dibenzoate, polyethylene glycol dibenzoate, and 2,2,4-trimethyl-1,3-pentanediol isobutyrate benzoate.

It will be clear to those having ordinary skill in the art that other materials such as pigments, filler, and the like can be incorporated into the composition to impart color, texture and strength. A preferred material is fiber such as synthetic resin fiber, fiberglass, carbon fiber, or the like. These fibers can be used for decorative effects but are best utilized to impart high strength. The fiber is used in an amount of from 25 to 75 percent, preferably about 40 to 60 percent by weight, based on the weight of the entire composition. The strengthened composition can be used as indicated above and finds particular utility in the fabrication of structural materials.

What is claimed is:

1. A composition capable of hardening into a hard, porcelain-like material and comprising:
   a first component comprising from 5.5 to 8 percent by weight of calcium oxide; from 45–75 percent by weight of potassium silicate; from 5.5 to 11 percent by weight of sodium oxide; from 12 to 21 percent by weight of alumina; and from 1 to 40 percent by weight of zinc oxide, the percentages by weight being based on the total amount of said first component; and
   a second component in an amount of from 30 to 70 percent by volume, based on the total volume of the first and second components, and comprising from 30 to 50 percent by weight of polyvinyl acetate resin; from 8 to 15 percent by weight of polyvinyl alcohol resin; from 30 to 50 percent by weight of water; from 2 to 10 percent by weight of an alkanolamine having an alkyl group of up to 5 carbon atoms, and from 2 to 10 percent by weight of a plasticizer for polyvinyl acetate resin;
   the solid ingredients of said composition being in the form of particles at least 50 percent by weight of which are less than 10 mesh, U.S. sieve size.

2. A composition according to claim 1 wherein the ingredients of the first component are substantially uniformly mixed with those of the second component.

3. A composition according to claim 1 wherein the particles are less than 10 mesh.

4. A composition according to claim 1 wherein the particles are less than 50 mesh and at least 50 percent by weight are less than 100 mesh.

5. A composition according to claim 1 wherein the first component further includes up to 5 percent by weight of particles of magnesium oxide.

6. A composition according to claim 1 wherein the first and second components have the following composition:

| first component | material | % by weight |
|---|---|---|
| | CaO | 6–7 |
| | $K_2SiO_3$ | 45–75 |
| | $Na_2O$ | 5.5–11 |
| | $Al_2O_3$ | 12–21 |
| | MgO | up to 5.0 |
| | ZnO | 5–20 |
| second component | material | % by weight |
| | polyvinyl acetate | 35–45 |
| | polyvinyl alcohol | 9–14 |
| | Alkanolamine | 3–7 |
| | Plasticizer | 3–7 |
| | Water | 35–45. |

7. A composition according to claim 6 wherein the plasticizer is a benzoic acid derivative.

8. A composition according to claim 6 wherein the alkanolamine is an alkyl dialkanolamine.

9. A composition according to claim 1 including strengthening fibers in an amount of from 25 to 75 percent by weight, based on the weight of the composition.

* * * * *